Nov. 20, 1956 — G. E. PORTER — 2,770,948
ASSISTER UNIT FOR HYDRAULIC BRAKE SYSTEMS
Filed Nov. 6, 1951 — 2 Sheets-Sheet 1

INVENTOR.
Gilbert E. Porter.
BY Knight & Rodgers
ATTORNEYS.

Nov. 20, 1956 G. E. PORTER 2,770,948
ASSISTER UNIT FOR HYDRAULIC BRAKE SYSTEMS
Filed Nov. 6, 1951 2 Sheets-Sheet 2
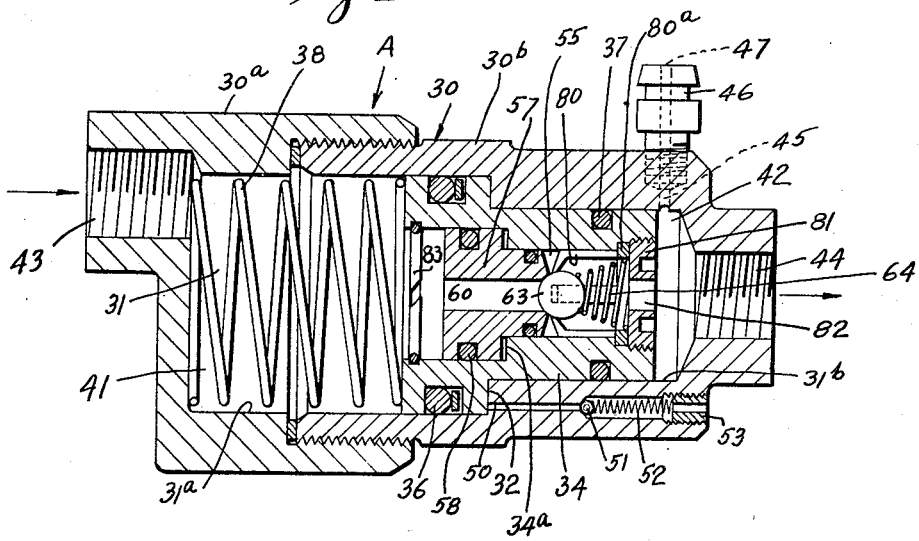
Fig. 4.
Fig. 5.
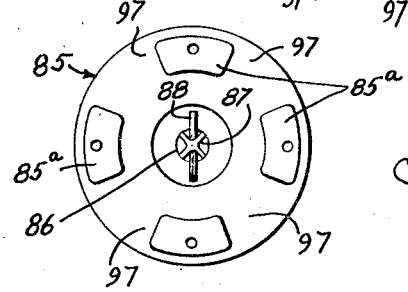
Fig. 6.
INVENTOR.
Gilbert E. Porter.
BY
Knight & Rodgers
ATTORNEYS.

United States Patent Office 2,770,948
Patented Nov. 20, 1956

2,770,948

ASSISTER UNIT FOR HYDRAULIC BRAKE SYSTEMS

Gilbert E. Porter, Los Angeles, Calif.

Application November 6, 1951, Serial No. 255,051

17 Claims. (Cl. 60—54.5)

The present invention relates generally to hydraulic actuating devices, and more particularly to an assister unit constituting a part of an hydraulic control system suitable for automotive vehicle brakes and the like. Since the present invention has been designed primarily as a part of an automobile brake system, it is shown and described in this connection as illustrative of the invention, but in its broader aspect, my invention is not limited to any particular use.

It is widely recognized by people who drive automobiles that it is often difficult to achieve that perfection of control in the application of brakes which is to be desired. One of the particular difficulties encountered is that of maintaining over an appreciable interval of time a relatively high pressure upon the brake system. The initial thrust upon the foot pedal can be quite vigorous and is adequate to give a hard application of the brakes. Because of the momentum of the parts and because it is possible to give a relatively strong thrust for a short time, a very high pressure may be initially built up in the brake system. But if it is desired to maintain this pressure for a considerable time, the operator may encounter considerable difficulty in doing so because of muscular fatigue. With a continual increase in weight and of the average speed at which automotive vehicles are moving, the work which the brakes are called upon to do is continually increasing; this is particularly true in the case of heavy vehicles, such as trucks.

These conditions have brought about the need for larger and heavier brake units and a corresponding increase in the operating pressures in the hydraulic system which in turn require greater exertion upon the operator to maintain a maximum thrust on the brake pedal over an extended interval of time. If the required high pressure in the hydraulic system can be maintained more easily and with less physical exertion, a greater margin of safety is afforded the drivers, and especially women, who are unable to operate the vehicle brakes as vigorously as may be required under all circumstances.

Thus it becomes a general object of my invention to provide an improved design for an assister unit which may be incorporated into conventional designs of hydraulic brake systems for a vehicle in order to provide easier control and maintenance of high braking pressures in the system.

It is another object of this invention to provide an assister unit of the character described which is capable of developing a comparatively high fluid pressure within the system and of subsequently maintaining this same fluid pressure unchanged by the exertion by the operator of a substantially decreased thrust upon the brake pedal.

Another object of the present invention is to maintain an initial hydraulic pressure within the system in order to take up the slack on the parts and improve the operation of the brakes, especially when for any reason clearance between the drum and the shoes increases or wear takes place in the other parts of the system.

Another object is to provide an assister of the character described which is a self-contained unit that may be added to the existing brake system of an automobile as an accessory or attachment without interfering with the proper operation of the braking system.

Still another object of my invention is to provide an assister unit of the character set forth which is simple and rugged in construction and therefore economical to make and reliable in operation.

These objects have been attained in a unit embodying my invention by providing a housing which has an internal cylinder formed with two portions of different diameters. In the larger diameter portion there is a fluid inlet and in the smaller diameter portion there is a fluid outlet to the housing. A differential piston is slidably mounted within the cylinder, the two sections of the piston being of proper size to form a fluid tight seal with the cylinder walls of corresponding diameters, thus dividing the entire cylinder into two chambers, one of larger diameter and the other of smaller diameter. The end faces of the differential piston are each subjected to fluid pressure existing in one of these two chambers. Fluid passage means interconnects the two chambers and valve means controls fluid flow through the passage. This valve means is typically a ball check valve which is urged by a spring toward its seat in which position the valve is closed and prevents fluid flow through the fluid passage from the smaller diameter chamber into the larger diameter one. Fluid pressure responsive means is provided that is adapted to move the valve to open position or to hold it there when fluid pressure in the larger chamber drops below that in the smaller chamber to a predetermined value, in order to allow reverse flow from the small chamber into the larger one when the brakes are released.

The pressure sensitive means for opening the valve may take various forms. For example, it may be a smaller differential piston slidably mounted within the larger piston with its end faces exposed to fluid pressure in the two chambers. The valve seat is then carried on this auxiliary piston and so is movable. Combined with this valve means is a suitable stop means such as a pin or other type of compression member which holds the valve off the valve seat when the auxiliary piston reaches or is near the limit of its travel in one direction. In place of the pin, a cage or similar tension member may be used which likewise restrains the ball in its travel to a position short of the position of the valve seat at the extreme range of the travel of the seat member. As an alternative, a pressure sensitive diaphragm member may be substituted for the auxiliary piston. A pin or other similar member may cooperate with the diaphragm to lift the ball check valve off its seat which in this case is formed on the main differential piston.

How the above and other objects and advantages of my invention, as well as others not specifically mentioned herein, are attained will be more readily understood by reference to the following description and to the annexed drawings, in which:

Fig. 4 is a longitudinal median section of another form of my invention;

Fig. 5 is a longitudinal median section of still another form of my invention employing a pressure responsive diaphragm; and Fig. 6 is an end elevation of the large end of the differential piston of Fig. 5, with the spring housing and diaphragm removed.

Figure 1:
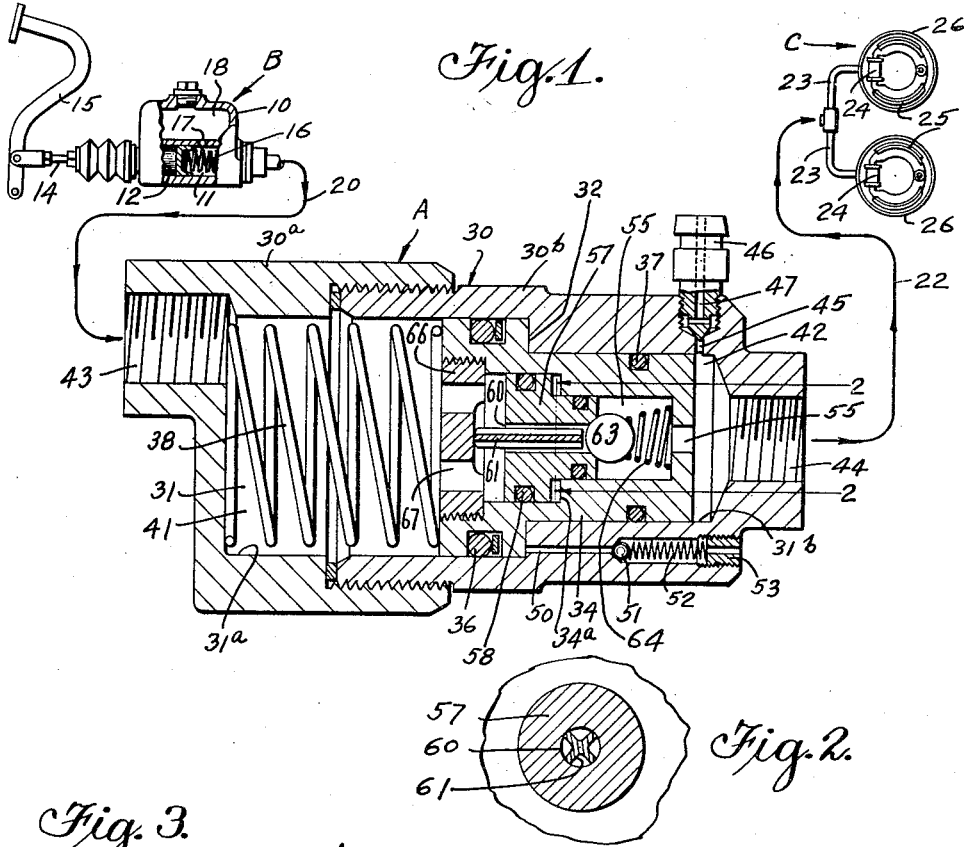
Fig. 1 is a longitudinal median section through a brake assister unit constructed according to my invention, with other portions of the brake system shown diagrammatically.

Referring now to Fig. 1, the assister unit of my invention is generally indicated at A and it is interposed in a hydraulic system between the master cylinder indicated generally at B and a brake assembly as generally indicated at C. The master cylinder device may be of any conventional construction; and typical of such construction comprises housing 10 which provides cylinder 11 and has a piston 12 within the cylinder. The piston is actuated by piston rod 14 which is connected to brake pedal 15 of an automobile in a conventional manner. The piston 12 is normally biased to a retracted position by means including spring 16 and in this position uncovers port 17 through which communication is established between cylinder 11 and reservoir space 18. A body of fluid is normally maintained in reservoir 18 which flows into the cylinder to keep the latter as well as the remainder of the system completely filled with fluid.

The outlet from the master cylinder B is at the forward end of cylinder 11, and this outlet is connected by conduit 20 to the hydraulic assister constituting my invention and indicated generally at A. Alternatively, the assister unit A may be designed to be attached directly to the forward end of the conventional master cylinder unit B so that the outlet of the cylinder 11 communicates directly with the assister unit, dispensing with the need for conduit 20.

The assister unit is in turn connected by second conduit means 22 and branch conduits 23 to fluid motors 24. Although these motors may operate any different type of apparatus, they are here shown as operating brake shoes 25 which are expanded thereby to engage brake drums 26. Each brake assembly C is here shown as including a fluid motor 24 and two brake shoes 25, but it will be understood that a larger or smaller number of fluid motors and brake shoes may be actuated from the same hydraulic system, since most brake systems have an assembly in each of four or six wheels.

Assister unit A has a housing 30 which is preferably made in two parts 30a and 30b in order that the interior parts may be easily assembled in position. Although the division between the two parts of the housing may be placed at other positions than that shown, an advantage of the construction illustrated is that the thread on the outside of housing section 30b is such that it fits the outlet opening to certain master cylinders. Thus housing section 30b can be screwed directly into the end of cylinder 11 in certain types of master cylinder units B.

Housing 30 has an internal cylinder indicated generally at 31. Cylinder 31 is made in two concentric or co-axial sections 31a and 31b of different diameters, section 31a being of larger diameter as shown. Where the two sections of the cylinder meet, there is formed annular shoulder 32 on the inside of housing 30.

Differential piston 34 is slidably mounted within cylinder 31. The differential piston is made in two sections of different diameters which correspond respectively to the diameters of cylinder sections 31a and 31b so that both sections of the differential piston are in fluid tight engagement with the cylinder walls. O-rings or other suitable type of packing are provided as at 36 and 37 to prevent leakage of fluid between the differential piston and the housing walls. At the junction of the two portions of the piston of different diameter, there is formed a forwardly facing annular shoulder which is normally in engagement with shoulder 32 on the housing, as shown in Fig. 1. Engagement of these two shoulders limits the forward travel of the piston. Compression spring 38 which is interposed between the rear end of piston 34 and the end wall of housing section 31a urges the piston forwardly and normally maintains it in the position shown in which shoulder 32 limits forward movement of the piston.

It will be seen from Fig. 1 that the differential piston is located intermediate and spaced from the ends of cylinder 31 and therefore divides the cylinder into two separate chambers 41 and 42 at the rear and front ends respectively of the housing. These chambers are the portions of cylinder sections 31a and 31b which are not filled by differential piston 34; and consequently the distinguishing characteristic of these two chambers is their difference in diameters. Rear chamber 41 has a larger diameter than does forward chamber 42.

Housing inlet 43 communicates with larger diameter chamber 41 and housing outlet 44 communicates with smaller diameter chamber 42. The designation of these two ports as inlet and outlet is somewhat arbitrary and refers to the direction of fluid flow during application of the brakes. When the brakes are released, fluid flows in the reverse direction, i. e., in at port 44 and out at port 43.

It is an important feature of all hydraulic systems that they should be entirely free from air in order to make full use of the incompressibility of the liquid in the system. The presence of air in the fluid makes the operation of the brakes spongy instead of firm. In order to remove any air from the front end of the housing, the housing has a bleed port 45 communicating with the top part of chamber 42. Port 45 is closed by needle valve 46 which is provided with a central bore 47 through which air may escape when the needle valve is raised from the seat at the upper end of port 45. By screwing down needle valve 46, the pointed end of the valve seats against the upper end of port 45 to prevent the loss of hydraulic fluid. For a similar reason an air bleed port 50 may be provided communicating with shoulder 32 to remove air or liquid that would prevent the piston from engaging shoulder 32. This passage 50 is closed by a ball check valve 51 urged against the forward end of the passage by spring 52. The spring abuts against plug 53 which holds the spring in position. The plug is provided with a central bore through which any air or liquid passing check valve 51 may escape to the atmosphere.

Fluid passage means extending between chambers 41 and 42 is provided in order that hydraulic fluid may be transferred between chambers 41 and 42. In a broad aspect of the invention, the passage is not necessarily in the differential piston, but is preferably so located for practical reasons. This passage means preferably comprises the single longitudinally extending bore 55 through piston 34. This longitudinal passage 55 is formed with several sections or steps of increasing diameter toward the rear of piston 34. Within two adjoining sections of different diameters of passage 55, there is slidably mounted an auxiliary differential piston 57 of which the rear section has a larger diameter than the forward section. Auxiliary piston 57 has a fluid tight seal with the walls of passage 55 and is preferably provided with O-ring packing or other packing means as indicated at 58 in order to maintain the fluid tight character of this seal and render the piston movable in response to fluid pressures in chambers 41 and 42.

Figure 2:
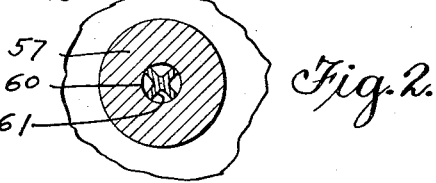
Fig. 2 is a fragmentary transverse section on line 2—2 of Fig. 1.

Piston 57 has a longitudinally extending bore 60 which extends entirely through the piston and forms a part of the fluid passage means interconnecting chambers 41 and 42. Within bore 60 is slidably mounted longitudinally extending pin 61. This pin is fluted or of cruciform cross section, as seen particularly in Fig. 2, in order that the pin does not prevent the free flow of fluid through passage 60.

A valve assembly is provided to control fluid flow through passage 55. The valve means of this assembly includes ball 63, or any other suitable type of valve member, and a seat member having an annular valve seat as is formed on the forward end of auxiliary piston 57 around the forward end of central passage 60. When engaging this seat, ball 63 closes the passage to fluid flow in a rearward direction through the differential piston. Valve member 63 is normally urged toward this closed or seated position by spring 64 which at one end bears against the ball and at the other end against piston 34.

The valve assembly controlling fluid flow also includes pin 61 which constitutes stop means for limiting the travel of valve member 63 toward the valve seat in order to hold ball 63 off the seat and keep the valve open. Rearward travel of pin 61 is limited by engagement of the pin at its rear end with plug 66 which is screwed or otherwise secured in place in the rear end of passage means 55 to provide an abutment. Pin 61 is of such length that, when auxiliary piston 57 is in the forward portion of its travel relative to main piston 34, the pin does not engage both the valve member and abutment 66. Thus the valve member is permitted to seat under the force supplied by spring 64. When the auxiliary piston moves to the rear, valve member 63 moves with the piston and in contact with the valve seat until it engages the forward end of pin 61 when movement of the valve member is stopped by pin 61 which now engages both the valve and the abutment 66. However, the auxiliary piston can travel on, thus carrying the seat away from the valve member and opening the valve means to pass fluid through passage 69. Thus the valve member is held in a position short of the position of the seat member at or near the extreme of the travel of the seat member away from the valve member. Plug 66 is provided with one or more fluid openings at 67 to allow fluid to freely flow through the plug and thus form no obstruction to the fluid passage means through the differential piston.

Pin 61 is here shown as a loose pin sliding in the fluid passage. Obviously it can be attached to abutment 66 as an integral part thereof, or it could be a stem on the valve member, without changing its purpose and function.

Operation

Having described the construction of a typical embodiment of my invention, I shall now describe briefly its mode of operation. When brake pedal 15 is depressed by the vehicle operator, piston 12 is advanced in cylinder 11 and fluid is forced out of the master cylinder unit under pressure through conduit 20. This fluid enters brake assister A through inlet 43, flows through the chamber of larger diameter and into fluid passage means 55 in differential piston 34. The pressure of this fluid is sufficient to unseat valve 63, allowing the fluid to flow around the valve and out the forward end of piston 34 to chamber 42 and outlet 44 from whence the fluid goes through conduit 22 to brake assembly C.

When the brakes are initially applied, the parts are in approximately the position shown in Fig. 1. Spring 38 keeps piston 34 moved fully forward bringing the piston into engagement with shoulder 32 on the housing. Auxiliary piston 57 may be at any place throughout its range of travel relative to the main differential piston, but probably occupies a position close to but just rearwardly of that shown in Fig. 1. As fluid pressure builds up the total pressure applied to the rear face of auxiliary piston 57 is greater than the force applied to the forward face by the fluid and consequently the fluid pressure moves the piston forwardly within bore 55 and relative to piston 34 until the auxiliary piston engages shoulder 34a on the main piston. For part of the advance movement piston 57 engages the check valve so that some of this movement of the member carrying the valve seat causes movement also of valve 63, compressing spring 64. At the same time movement of fluid keeps valve 63 open against the pressure of spring 64.

Assume now that brake pedal 15 is held depressed in a fixed position. Pressures throughout the braking system can become stabilized and therefore become equal in both chambers 41 and 42 and also throughout the passage means extending between the two chambers. Under this condition valve 63 seats under the pressure of spring 64 and rearward flow of fluid from the chamber of smaller diameter into the one of larger diameter is prevented by valve member 63. With valve 63 closed the fluid pressure applied to fluid motors 24 may be now maintained in the system ahead of the brake assister even though the fluid pressure developed by the master cylinder unit B is reduced. How much reduction is permitted and still maintain the same pressure on the brakes depends upon the ratio of the areas of the two ends of differential piston 34. Assume by way of typical example that the rear face of piston 34 exposed to fluid pressure in chamber 41 has exactly twice the net effective area of the forward end of the piston exposed to fluid pressure in chamber 42. If the pressure of the fluid in conduit 22 has been raised to 1,000 pounds per square inch, this same fluid pressure is now applied to the forward end of the differential piston. The forces on the piston will then be balanced by a fluid pressure of only half that much, or 500 pounds per square inch, developed by master cylinder unit B since this pressure in chamber 41 of larger diameter is applied over twice the area on the differential piston. Actually, the fluid pressure in chamber 41 can be reduced somewhat below 500 pounds per square inch before piston 34 moves rearwardly because the force applied to the piston by spring 38 is added to the force on its rear end from fluid pressure. In actual design, the total force developed by spring 38 would be of the order of magnitude of 25 to 50 pounds; and therefore with a spring of this strength and a net effective area of 1.5 square inches on the large end of piston 34, the fluid pressure in chamber 41 can be reduced to the vicinity of 475 pounds per square inch to reach an exact balance between the total forces applied to the two end faces of the differential piston.

Since these pressure or force relationships exist, it will be seen that a given pressure after it has once been established in the brake units can be maintained with a much lower force applied to the system through brake pedal 15, neglecting any loss by friction. In this example, the actual pressure applied to brake pedal 15 can be reduced to approximately one-half its initial value and still maintain the same unit pressure at the fluid motors 24 or other comparable elements of the system. It is clear that this makes braking much easier and allows the vehicle operator to maintain a high brake effort with less exertion and fatigue.

Continuing with our assumed example, if now the pressure in the larger diameter chamber drops below 475 pounds per square inch by relaxing the thrust on brake pedal 15, the force on the forward end of the differential piston causes it to move slightly to the rear away from shoulder 32, compressing spring 38. Continued drop in fluid pressure in chamber 41 eventually permits auxiliary piston 57 to move rearwardly away from shoulder 34a under the force applied to its forward end by fluid pressure held on the outlet side of valve 63. In order to establish the right sequence of operation and delay movement of the auxiliary piston until after the main piston moves rearwardly, the ratio between the end areas of the auxiliary piston is somewhat greater than the ratio of the end areas of the main differential piston. In the assumed example, the ratio of the area on the large end of piston to the area on the forward or small end is 2:1. Typically, the ratio of the area of the rear or large end of piston 57 to the area of the forward or small end is about 2.25:1. With these proportions the fluid pressures keep the auxiliary piston fully advanced until the decrease in pressure in the larger chamber reaches a value allowing the main piston to start its rearward movement. In actual practice, the initial rearward movement of the main piston 34 results in a corresponding drop in pressure forward of assister A; and when fluid pressure in larger chamber 41 has decreased to about 50 pounds per square inch, the relative pressures are such that the auxiliary piston moves rearwardly relative to the main piston in order to open the valve means. This movement of the auxiliary piston brings pin 61 into engagement with both abutment 66 and ball valve 63. This engagement stops rearward movement of the valve member which has been following the piston and allows the auxiliary piston carrying the valve seat to continue on to the rear. This relative movement of the valve member and the seat member opens the valve and allows fluid to flow from the smaller diameter chamber through the passage means in the differential piston into the larger diameter chamber of the brake assister. The fluid then also can flow backwardly through conduit 20 into cylinder 11. With the equalization of fluid pressures throughout the system at a low value, spring 38 advances the differential piston to the position shown in Fig. 1. Conditions are now those at the starting point of the operational cycle.

Figure 3:
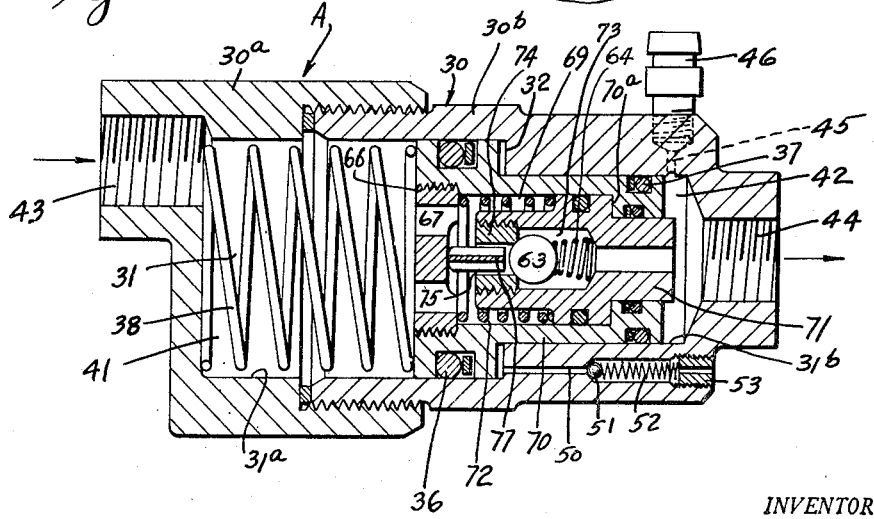
Fig. 3 is a longitudinal median section of a different form of my invention.

*Embodiment of Fig. 3*

There is illustrated in Fig. 3 another embodiment of my invention which differs from the form previously described only in certain specific features which will be pointed out. Housing 30 is of the same construction as described and consequently the external configuration of differential piston 70 is the same as that of differential piston 34. However, the internal bore 69 through the piston has been modified in cross-section in order to accommodate an auxiliary piston 71 which still functions similarly to piston 57, but in this instance the auxiliary piston has been made longer so that it extends approximately to the forward end of the main differential piston. Again, piston 71 is slidably mounted within the main differential piston and is provided with suitable packing means in order to maintain a fluid tight connection between the two pistons as the auxiliary piston moves relative to the outer one.

A distinguishing feature of this form of my invention is compression spring 72 which is inserted between abutment plates 66 and a rearwardly facing shoulder on piston 71. The compression spring normally urges the auxiliary piston forwardly to maintain it in contact with shoulder 70a on the differential piston, which is the position of the parts as shown in Fig. 3. The purpose and operation of this spring will be described later.

Auxiliary piston 71 is provided with a longitudinally extending fluid passage 73 which extends entirely through the piston; and into the one end of this passage there is threaded plug 74. Plug 74 is provided with a longitudinally extending opening 75 which is part of the fluid passage means through the pistons; and at the forward end of passage 75 there is formed an annular valve seat against which ball 63 can rest in order to close passage 75 to the flow of liquid from chamber 42 toward chamber 41. Check valve 63 is normally urged toward the seated or closed position shown in Fig. 3 by spring 64, as previously described. It will be noted that in this construction valve 63 and spring 64 are contained entirely within the fluid passage 72 inside the auxiliary piston rather than being contained in that part of the fluid passage which lies only within the main differential piston. The fixed end of spring 64 bears against a shoulder on piston 71 (instead of against the main piston as in Fig. 1) but there is no change in function because of this change in construction.

To complete the valve assembly, a fluted or cruciform pin 77 is placed within passage 75 and is free to slide longitudinally therein, in the same manner as pin 61 previously described. The rear end of pin 77 engages abutment 66 to limit its rearward travel, while the forward end of the pin is adapted to engage check valve 63 in order to limit the travel of the valve member 63 toward the seat carried on plug 74, under certain conditions, and thus hold the valve open against spring 64.

The operation of the form of brake assister illustrated in Fig. 3 is essentially the same as that already described, except that there is a slight difference in the action at the beginning and at the end of the cycle. In the embodiment of Fig. 1, auxiliary piston 57 is moved to the rear under the substantially higher fluid pressure exerted on the front end of the piston when fluid pressure in the larger diameter chamber is decreased below a predetermined value, thus opening the valve at 63 to allow reverse flow of fluid out of the brake unit and back into the reservoir of the master cylinder unit. There is no restoring force applied to the auxiliary piston with the result that the piston ordinarily comes to rest after the brakes are fully released with valve 63 still open. In the embodiment of Fig. 3, compression spring 72 exerts a restoring force on the auxiliary piston ensuring that valve 63 is always seated against the traveling seat on plug 74 when the pressure in forward chamber 42 is less than some predetermined relatively low value.

This low value is usually established in the neighborhood of approximately 15–25 pounds per square inch. It is sufficient to keep brake shoes 25 expanded short of actual braking contact with drums 26. Residual pressure for this purpose is conventionally maintained in braking systems in order to obtain a faster response to the action of the operator as well as to maintain an internal pressure in the system which prevents entrance of air. The strength of spring 72 is so adjusted that at the desired predetermined level of fluid pressure in chamber 42, the spring advances auxiliary piston 71 relative to piston 70 until it is stopped by engagement with the shoulder 70a. In this position spring 64 can seat valve 63 against the traveling valve seat since the ball valve is out of engagement with pin 77.

This design is for use when portion 30b of the housing is attached directly to the end of the master cylinder, or when the brake assister is otherwise attached to the master cylinder in such a way as to eliminate the usual check valve which is commonly placed in the master cylinder unit B at the forward end of cylinder 11. The purpose of this check valve is to maintain the type of residual pressure in the brake lines described; and when this valve is removed from the master cylinder in the act of attaching the brake assister, its function is then taken over by the brake assister, and more particularly by spring 72 which causes valve 63 to hold a small residual pressure in the brake lines.

The presence of this pressure in chamber 42 may cause the brake assister to operate in a slightly different fashion at the beginning of the cycle as pedal 15 is first depressed. The residual pressure in the brake lines may be sufficient to move piston 70 slightly to the rear against the force of spring 38, thus leaving a slight gap at shoulder 32, as in Fig. 3. This gap is ordinarily of the magnitude of approximately 1/16 inch. As fluid pressure is built up in chamber 41 when the brakes are being applied, there is a tendency for piston 70 to act as a force multiplying unit. This action is generally referred to as "compounding." Because of the difference in the effective areas at the forward and rearward ends of the differential piston, a lesser fluid pressure at the rear end of the piston can produce a higher fluid pressure at the forward end as the piston moves forward into engagement with shoulder 32 on the housing. This compounding action of the piston makes for an easy initial movement of brake pedal 15; but it occupies only a short initial portion of the stroke since valve 63 quickly opens after the piston engages shoulder 70a. Once valve 63 is open, the device operates in the same manner as previously described.

*Embodiment of Fig. 4*

There is illustrated in Fig. 4 another embodiment of my invention which differs from that illustrated in Fig. 1 in the form of stop means provided as a part of the valve assembly to limit the travel of the valve member toward the valve seat member in order to open the valve means and permit fluid flow through the differential piston between the chamber of smaller diameter and the chamber of large diameter.

In this form of the invention, longitudinally extending pin 61 of Fig. 1 has been eliminated and replaced by ball cage 80. As compared with the construction shown in Fig. 1, fluid passage 55 in the differential piston is enlarged at its forward end and into this enlargement is screwed plug 81. Annular base 80a of the cage is held between plug 81 and a shoulder on the piston. Attached to the cage base are a plurality of spaced fingers with inwardly bent ends that engage the ball valve member 63 in order to limit its travel toward the valve seat which is formed on the forward end of piston 57 and around the end of fluid passage 60. Spring 64 which normally urges the ball valve member towards engagement with its seat is interposed between the forward side of ball 63 and the face of plug 81. Of course plug 81 has a central opening as at 82, or other passage means, which forms a part of the entire fluid passage means extending between the two chambers of the assister.

In operation, when fluid pressure causes auxiliary piston 57 to move rearwardly, spring 64 keeps ball 63 in engagement with the valve seat on the movable valve seat member 57 until such time as the fingers on cage 80 engage the ball and prevent its further rearward travel. This is the position shown in Fig. 4. Further rearward movement of auxiliary piston 57 disengages it from ball 63; and the separation of the valve member from the valve seat allows fluid flow through the differential piston.

In this form of the invention, abutment plug 66 has also been eliminated. It is no longer needed to limit travel of pin 61 or an equivalent member. However, some means is preferred to limit the rearward travel of the auxiliary piston, and for this purpose split ring 83 is placed in a groove in the bore of the main piston. Otherwise, the construction and operation of the embodiment of my invention illustrated in Fig. 4 is the same as that illustrated in Fig. 1, except as specifically noted.

*Embodiment of Fig. 5*

There is illustrated in Fig. 5, another embodiment of my invention which differs from the forms previously described chiefly in the arrangement and construction of the fluid pressure responsive means operable to open the valve means that controls flow through the fluid passage between chambers 41 and 42.

Housing 30 is of the same construction as described above and consequently the external configuration of differential piston 85 is the same as that of differential piston 34. However, the internal bore has again been modified in shape while still maintaining its function as a fluid passage means extending through the differential piston in order to permit fluid flow between the larger and smaller diameter chambers at the rear and front ends respectively of the housing. This bore through the differential piston has a small diameter section 86 in which is slidably mounted pin 87. This pin is of cruciform or other shape which permits the pin to have contact with the bore walls to guide it but at the same time permits fluid flow through the bore. A transverse stop 88 is attached to sliding pin 87 near one end to engage piston 85 in order to limit travel of pin 87 in a forward direction.

At the forward end of the small diameter section 86 of the central bore, the fluid passage is enlarged to form chamber 90 and there is formed an annular valve seat 86a around the bore. A valve member 63 is adapted to engage seat 86a in order to close the passage means through the piston to fluid flow from chamber 42 into chamber 41. Compression spring 64 urges valve member 63 toward the valve seat and into engagement therewith. The spring is interposed between ball 63 and plug 89. Plug 89 is threaded into the forward open end of chamber 90. Chamber 90 communicates with bore 86 and with chamber 42 through passage 91, and so forms a portion of the fluid passage means extending through the piston.

On the rear end of piston 85 there is attached casing 93 by means of screws 94. Casing 93 is cup-shaped and is closed at one side by flexible diaphragm member 95. Inside casing 93 is compression spring 96 which at one end bears against the wall of the casing and at the other end against the inside face of diaphragm 95. On its outside face, diaphragm 95 engages the rearward end of pin 87. When the brakes are released, spring 96 biases diaphragm 95 and pin 87 toward the forward positions shown in Fig. 5 in which pin 87 engages valve member 63 to move it away from the valve seat at 86a.

Casing 93 is attached to the rear face of piston 85 at a series of spaced raised bosses 85a on the piston. Between successive bosses are openings 97 (see Fig. 6) through which fluid may pass from chamber 41 to reach the fluid passage extending through the differential piston, which passage includes bores 86 and 90. The forward face of flexible diaphragm 95 is fully exposed to the fluid pressure existing in larger diameter chamber 41; and this fluid pressure is exerted on the diaphragm in a direction to oppose the force of spring 96. As a consequence, when the fluid pressure in the rear chamber exceeds a predetermined value, diaphragm 95 is moved rearwardly and spring 96 is compressed, thus allowing pin 87 to move to the rear. Since ball valve member 63 is no longer held in the open position, it is then moved by spring 64 into sealing engagement with valve seat 86a.

The operation of this embodiment is essentially the same as that of the form illustrated in Fig. 1, except for variations which will now be pointed out. When there is little or no pressure in the brake lines, the parts within the brake assister occupy the normal or rest positions shown in Fig. 5. Under the pressure of spring 96, diaphragm 95 is advanced until stop 88 on pin 87 engages the piston and limits forward travel of the pin and diaphragm. The pin at its forward end engages ball 63 and holds it away from the valve seat. Thus free fluid communication is maintained between chambers 41 and 42.

As the brakes are now applied by depressing pedal 15, fluid pressure builds up in chamber 41 and is transmitted through the passage means in the differential piston to chamber 42 and thence to the brake lines and the brake units. As necessary to establish and maintain this increase in pressure, fluid may flow through this passage means. In response to this increase in fluid pressure in chamber 41, diaphragm 95 is moved rearwardly to compress spring 96 and at some predetermined fluid pressure the deflection of the diaphragm is sufficient that pin 87 is no longer able to hold the ball valve off its seat towards which it is continually urged by spring 64. Since pin 87 is free to slide within bore 86, it can move rearwardly under the influence of spring 64. From this it will be seen that pin 87 may be a separate member as illustrated, or it may be formed integrally with either ball member 63 or diaphragm 95.

Under these conditions, increasing fluid pressure in chamber 41 opens valve member 63 against spring 64 and is communicated to chamber 42. On the other hand, when the pressure within chamber 41 is constant, then the pressures equalize throughout the assister and ball 63 is seated by spring 64. This is the situation existing after the maximum build up of pressure in chamber 41; and as pressure is then decreased in chamber 41 by allowing brake pedal 15 to return to its normal position, pressure in chamber 41 drops down to a certain point without any decrease in pressure in chamber 42. This point is determined by the relative size of the net effective areas of the two ends of the differential piston exposed respectively to fluid pressures in chambers 41 and 42. If it is again assumed that the ratio of these areas is 2:1, then unit pressure in chamber 41 can drop to one-half the unit pressure in chamber 42 (neglecting the effect of spring 38) before there is any movement of differential piston 85 to the rear.

After the decreasing pressure in chamber 41 passes this critical value, the total force on the forward end of the piston is greater than the total force on the rear end of the piston and differential piston 85 moves to the rear within the assister housing. This movement of the differential piston continues until the decreasing pressure in chamber 41 is reduced to or below some predetermined value at which diaphragm 95 and pin 87, in response to the decreasing fluid pressure, are advanced by spring 96 to move the check valve member away from seat 86a. Free fluid communication is then established between chambers 41 and 42 and fluid can flow rearwardly into chamber 41, thus bringing about an equalization of fluid pressures throughout the assister and permitting spring 38 to again advance the differential piston to bring it into contact with shoulder 32 on the housing.

Having described several embodiments of my invention, it will be apparent that various changes in the detailed construction and arrangement of parts may occur to persons skilled in the art but without departing from the spirit of my invention or the essential principles of operation thereof. Consequently, it is to be understood that the foregoing description is considered as being illustrative of, rather than limitative upon, the appended claims.

I claim:

1. In an hydraulic assister for a fluid control system, the combination comprising: a housing with an internal cylinder having a larger diameter portion with a fluid inlet and a smaller diameter portion with a fluid outlet; a differential piston movable within the cylinder and dividing the cylinder into a larger diameter chamber and a smaller diameter chamber, the piston having two end faces of different effective areas exposed respectively to fluid pressures in the larger and smaller diameter chambers; a single fluid passage means extending between the two chambers; check valve means associated with the passage means for closing the passage to fluid flow from the smaller diameter into the larger diameter chamber but opening in response to excess pressure in the larger diameter chamber, said check valve means including a seat member and a valve member movable relative to each other to an open position; and valve operating means for opening said valve means in response to a decrease in fluid pressure in the larger diameter chamber below a predetermined value, said valve operating means including a pressure responsive member carried on the differential piston and exposed to fluid pressure in the larger diameter chamber to move relative to the piston in response to said fluid pressure, said pressure responsive member being operatively associated with one of said members of the check valve means to transmit motion thereto to move said one member of the valve means relative to the other.

2. In an hydraulic assister for a fluid control system, the combination comprising: a housing with an internal cylinder having a larger diameter portion with a fluid inlet and a smaller diameter portion with a fluid outlet; a differential piston movable within the cylinder and dividing the cylinder into a larger diameter chamber and a smaller diameter chamber, the piston having two end faces of different effective areas exposed respectively to fluid pressures in the larger and smaller diameter chambers; a single fluid passage means through the piston between the larger diameter and smaller diameter chambers; valve means within the piston controlling fluid flow through the passage means, said valve means including a valve seat and a valve member movable relative to each other, said valve seat being movable relative to the piston, and spring means urging the valve member into engagement with the valve seat; and fluid pressure responsive means operatively associated with the seat member and operable in response to a predetermined decrease in fluid pressure in the larger diameter chamber to open the valve means by moving the seat member relative to said valve member.

3. An hydraulic assister as in claim 2 in which the fluid pressure responsive means includes a second differential piston exposed to fluid pressures in the larger and smaller diameter chambers.

4. In an hydraulic assister for a fluid control system, the combination comprising: a housing with an internal cylinder having a larger diameter portion with a fluid inlet and a smaller diameter portion with a fluid outlet; a differential piston movable within the cylinder and dividing the cylinder into a larger diameter chamber and a smaller diameter chamber, the piston having two end faces of different effective areas exposed respectively to fluid pressures in the larger and smaller diameter chambers; a single fluid passage means through the piston between the larger diameter and smaller diameter chambers; valve means within the piston controlling fluid flow through the passage means, said valve means including a valve seat and a valve member movable relative to each other, and spring means urging the valve member into engagement with the valve seat; a fluid pressure responsive member carried on the piston and movable in one direction in response to fluid pressure in the larger chamber; spring means urging the pressure responsive member in the opposite direction against said fluid pressure; and a valve operating member transmitting spring-induced motion of the pressure responsive member to the valve member to move the valve member away from its seat to open position.

5. In an hydraulic assister for a fluid control system, the combination comprising: a housing with an internal cylinder having a larger diameter portion with a fluid inlet and a smaller diameter portion with a fluid outlet; a differential piston movable within the cylinder and dividing the cylinder into a larger diameter chamber and a smaller diameter chamber, the piston having two end faces of different effective areas exposed respectively to fluid pressures in the larger and smaller diameter chambers; fluid passage means through the piston between the larger diameter and smaller diameter chambers; and a valve assembly controlling fluid flow through the passage means, said valve assembly comprising a movable valve seat member carried on and movable relative to said piston, a movable valve member spring-biased toward engagement with the valve seat member to close the passage means to fluid flow from the smaller diameter chamber into the larger diameter chamber, and stop means limiting the travel of the valve member and thereby open the valve member.

6. An hydraulic assister as in claim 5 in which the stop means is a pin extending longitudinally of the piston and engaging at one end a portion of the piston and at its other end the valve member to hold the valve member away from the valve seat member.

7. An hydraulic assister as in claim 5 in which the stop means is a stationary cage attached to the piston and engaging the valve member to hold the valve member away from the valve seat member.

8. An hydraulic assister as in claim 5 that also includes fluid pressure sensitive means for positioning the movable valve seat member relative to the piston.

9. In an hydraulic assister for a fluid control system, the combination comprising: a housing with an internal cylinder having a larger diameter portion with a fluid inlet and a smaller diameter portion with a fluid outlet; a differential piston movable within the cylinder and dividing the cylinder into a larger diameter chamber and a smaller diameter chamber, the piston having two end faces of different effective areas exposed respectively to fluid pressures in the larger and smaller diameter chambers; fluid passage means through the piston between the larger diameter and smaller diameter chambers; and a valve assembly controlling fluid flow through the passage means, said valve assembly comprising a movable valve seat member carried on and movable relative to said piston and having an annular valve seat, a movable ball engageable with the annular seat to close the passage means to fluid flow therethrough from the smaller diameter chamber to the larger diameter chamber, yielding means urging the ball toward said seat member but yielding under fluid pressure on the ball in a direction to move the ball away from the seat member to allow fluid flow through the passage into the smaller diameter chamber, and stop means limiting the travel of the ball induced by said yielding means to a position short of the position of the annular seat at one extreme of travel of the valve seat member.

10. In an hydraulic assister for a fluid control system, the combination comprising: a housing with an internal cylinder having a larger diameter portion with a fluid inlet and a smaller diameter portion with a fluid outlet; a differential piston movable within the cylinder and dividing the cylinder into a larger diameter chamber and a smaller diameter chamber, the piston having two end faces of different effective areas exposed respectively to fluid pressures in the larger and smaller diameter chamber; a fluid passage means through the piston between the larger diameter and smaller diameter chambers; valve means controlling fluid flow through the passage means, said valve means comprising a movable valve seat member movable relative to the piston in a direction parallel to the piston movement, a valve member movable relative to the piston and toward and away from the seat member to engage the seat member and close the passage means to fluid flow from the smaller diameter to the larger diameter chamber, and spring means urging the valve member toward the seat member; and stop means limiting the movement of the valve member toward the seat member to a position short of engagement with the seat member at the extreme of the travel of the seat member away from the valve member.

11. In an hydraulic assister for a fluid control system, the combination comprising: a housing having an internal cylinder having a larger diameter portion with a fluid inlet and a smaller diameter portion with a fluid outlet; a differential piston movable within the cylinder and dividing the cylinder into a larger diameter chamber and a smaller diameter chamber, the piston having end faces of different effective areas exposed respectively to fluid pressures in the larger and smaller diameter chambers; an auxiliary differential piston movable within a differential bore in the main differential piston and having end faces of different effective areas exposed respectively to fluid pressures in the larger and smaller diameter chambers; fluid passage means extending through both pistons between the larger diameter and the smaller diameter chambers; a valve seat carried by the auxiliary piston; a check valve spring-biased toward engagement with the valve seat to close the passage means to fluid flow therethrough from the smaller diameter chamber to the larger diameter chamber; and stop means holding the check valve in open position to allow free fluid flow through the passage means when the auxiliary piston is at one end of its range of movement relative to the main piston.

12. An hydraulic assister as in claim 11 in which the stop means is a pin extending longitudinally of the main piston and engages the main piston at one end and the check valve at the other end to hold the valve away from the valve seat.

13. An hydraulic assister as in claim 11 in which the stop means is a stationary cage attached to the main piston and engaging the check valve to hold the valve away from the valve seat.

14. An hydraulic assister as in claim 11 in which the auxiliary piston engages the main piston at either end of its stroke to limit its movement relative thereto, and which also includes spring means bearing against both pistons urging the auxiliary piston in the direction of the smaller diameter chamber in opposition to fluid pressure in the smaller chamber.

15. An hydraulic assister as in claim 11 in which the check valve is in that portion of the fluid passage means located within the auxiliary piston.

16. An hydraulic assister as in claim 11 in which the ratio of the area of the larger end face of the auxiliary piston to the area of the smaller end face is greater than the corresponding ratio of the areas of the end faces of the main differential piston.

17. In an hydraulic assister for a fluid control system, the combination comprising: a housing with an internal cylinder having a larger diameter portion with a fluid inlet and a smaller diameter portion with a fluid outlet; a differential piston movable within the cylinder and dividing the cylinder into a larger diameter chamber and a smaller diameter chamber, the piston having two end faces of different effective areas exposed respectively to fluid pressures in the larger and smaller diameter chambers; a single fluid passage means extending between the two chambers; check valve means associated with the passage means for closing the passage to fluid flow from the smaller diameter into the larger diameter chamber but opening in response to excess pressure in the larger diameter chamber, said check valve means including a seat member and a valve member movable relative to each other to an open position; valve operating means for opening said valve means in response to a decrease in fluid pressure in the larger diameter chamber below a predetermined value, said valve operating means including a pressure responsive member carried on the differential piston and exposed to fluid pressure in the larger diameter chamber to move relative to the piston in response to said fluid pressure, said pressure responsive member being operatively associated with one of said members of the check valve means to transmit motion thereto to move said one member of the valve means relative to the other; and a compression spring in the chamber of larger diameter and bearing against the differential piston to urge it in the same direction as does fluid pressure in the chamber of larger diameter.

References Cited in the file of this patent

UNITED STATES PATENTS

| | | |
|---|---|---|
| 2,207,173 | Goepfrich | July 9, 1940 |
| 2,351,153 | Schnell | June 13, 1944 |
| 2,488,433 | Porter | Nov. 15, 1949 |

FOREIGN PATENTS

| | | |
|---|---|---|
| 668,612 | Germany | Dec. 7, 1938 |